(12) United States Patent
Chau et al.

(10) Patent No.: US 10,931,783 B2
(45) Date of Patent: Feb. 23, 2021

(54) TARGETED PROFILE PICTURE SELECTION

(71) Applicant: INTERNATIONAL BUSINESS MACHINES CORPORATION, Armonk, NY (US)

(72) Inventors: Kwan Yin Andrew Chau, New South Wales (AU); Asela J. Mallawaaratchy, New South Wales (AU); Vatsla Nagpaul, New South Wales (AU); Mark T. H. Taylor, New South Wales (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/537,040

(22) Filed: Aug. 9, 2019

(65) Prior Publication Data

US 2019/0379760 A1    Dec. 12, 2019

Related U.S. Application Data

(63) Continuation of application No. 15/414,980, filed on Jan. 25, 2017, now Pat. No. 10,425,498.

(51) Int. Cl.
*H04L 29/08* (2006.01)
*H04L 12/58* (2006.01)
*G06F 3/0484* (2013.01)

(52) U.S. Cl.
CPC ............ *H04L 67/306* (2013.01); *H04L 51/04* (2013.01); *H04L 51/046* (2013.01);
(Continued)

(58) Field of Classification Search
CPC .... G06F 3/04847; H04L 67/306; H04L 51/04
See application file for complete search history.

(56) References Cited

U.S. PATENT DOCUMENTS 7,091,976 B1      8/2006   Ostermann et al.
7,468,729 B1 *  12/2008   Levinson ................ A63F 13/79
                                                                    345/419
(Continued)

OTHER PUBLICATIONS

"Multiple 'profile pics' per user?" Retrieved from the Internet: < URL:http://ux.stackexchange.com/questions/79776/multiple-profile-pics-per-user >, ux.stackexchange.com, copyright 2016, 3 pgs.
(Continued)

*Primary Examiner* — Shourjo Dasgupta
(74) *Attorney, Agent, or Firm* — Brian Restauro; Matthew M. Hulihan; Heslin Rothenberg Farley & Mesiti PC

(57) ABSTRACT

Targeted profile picture selection includes providing for a first user of a messaging service contextual parameter categories upon which contextual messaging service profile picture selection for the first user is available to be made, receiving a definition of selection rule(s) for each of one or more categories of the plurality, prioritizing how the selection rule(s) of each of the one or more categories is applied in profile picture selection for the first user, ascertaining a current context under which a selected profile picture for the first user is to be conveyed to a messaging client of a second user of the messaging service, the current context indicating a respective parameter for each of the one or more categories, and based on the prioritizing and the ascertained current context, selecting the profile picture for conveyance to the messaging client of the second user.

14 Claims, 7 Drawing Sheets

```
200
 \
User A profile picture settings:
   -USER IDENTITY: ─── 202
       -Picture to use for User B: image1.jpg
       -Picture to use for Spouse: image2.png -LOCATION: ─── 204
       -Home:
           -Picture to use for Everyone: image3.gif
           -Picture to use for Group C: image2.png
           -Picture to use for User B: image5.jpg -STATUS: ─── 206
       -Picture to use for "Running on Treadmill": image6.jpg
       -Picture to use for "Making Dinner": image7.jpg -TIME: ─── 208
       -Picture to use for 11:00 PM – 6:00 AM: image8.jpg -CONNECTION: ─── 210
       -Picture to use for Connection to Car Bluetooth: image9.jpg
       -Picture to use for Connection to Cabin Wi-Fi: image10.jpg
```

(52) U.S. Cl.
CPC ............ *H04L 51/063* (2013.01); *H04L 51/10* (2013.01); *G06F 3/04847* (2013.01)

(56) References Cited

U.S. PATENT DOCUMENTS

| | | | |
|---|---|---|---|
| 8,026,918 B1* | 9/2011 | Murphy | H04L 67/38 |
| | | | 345/473 |
| 8,458,041 B1 | 6/2013 | Jakobsson | |
| 8,867,849 B1 | 10/2014 | Kirkham et al. | |
| 9,652,809 B1* | 5/2017 | Levinson | G06F 16/335 |
| 9,653,000 B2 | 5/2017 | Wee | |
| 2009/0300525 A1* | 12/2009 | Jolliff | H04L 67/306 |
| | | | 715/764 |
| 2010/0306708 A1 | 12/2010 | Trenz et al. | |
| 2012/0076427 A1 | 3/2012 | Hibino et al. | |
| 2012/0188405 A1 | 7/2012 | Morrison et al. | |
| 2012/0311462 A1* | 12/2012 | Devecka | G06Q 30/0273 |
| | | | 715/753 |
| 2012/0324005 A1* | 12/2012 | Nalawade | G06Q 50/01 |
| | | | 709/204 |
| 2013/0205408 A1 | 8/2013 | Yerli | |
| 2013/0282808 A1 | 10/2013 | Sadanandan et al. | |
| 2014/0156762 A1 | 6/2014 | Yuen et al. | |
| 2014/0157153 A1 | 6/2014 | Yuen et al. | |
| 2014/0280533 A1 | 9/2014 | Chedeau et al. | |
| 2015/0092070 A1 | 4/2015 | Hatano et al. | |
| 2015/0370830 A1 | 12/2015 | Murphy-Chutorian et al. | |
| 2016/0140934 A1 | 5/2016 | Frieder et al. | |
| 2016/0162513 A1 | 6/2016 | Madjar et al. | |
| 2016/0164988 A1 | 6/2016 | Grewal et al. | |
| 2016/0179769 A1 | 6/2016 | Gershom et al. | |
| 2016/0255162 A1 | 9/2016 | Frieder et al. | |
| 2016/0358283 A1* | 12/2016 | Regala | A63F 13/87 |
| 2017/0256040 A1 | 9/2017 | Grauer | |
| 2018/0095606 A1 | 4/2018 | Chae et al. | |
| 2018/0137604 A1* | 5/2018 | Bostick | G06T 5/003 |
| 2018/0176614 A1* | 6/2018 | Lin | G11B 27/031 |
| 2018/0213056 A1 | 7/2018 | Chau et al. | |

OTHER PUBLICATIONS

Lemos, Fabricio D.A., "Towards a Context-Aware Photo Recommender System". Retrieved from the Internet:< URL:http://ceur-ws.org/Vol-889/paper4.pdf >, 5 pgs.

"Can I show a different profile picture to different friend lists?" [retrieved on Jan. 18, 2017]. Retrieved from the Internet< URL: https://www.facebook.com/help/community/question/?id= 885105754363 >, 1 pg.

Mell, Peter, et al., "The NIST Definition of Cloud Computing", NIST Special Publication 800-145, Sep. 2011, Gaithersburg, MD, 7 pgs.

List of IBM Patents or Applications Treated as Related, Aug. 9, 2019, 2 pgs.

* cited by examiner

200

User A profile picture settings:

-USER IDENTITY: 202
- Picture to use for User B: image1.jpg
- Picture to use for Spouse: image2.png -LOCATION: 204
- Home:
- Picture to use for Everyone: image3.gif
- Picture to use for Group C: image2.png
- Picture to use for User B: image5.jpg -STATUS: 206
- Picture to use for "Running on Treadmill": image6.jpg
- Picture to use for "Making Dinner": image7.jpg -TIME: 208
- Picture to use for 11:00 PM – 6:00 AM: image8.jpg -CONNECTION: 210
- Picture to use for Connection to Car Bluetooth: image9.jpg
- Picture to use for Connection to Cabin Wi-Fi: image10.jpg

FIG. 2

TARGETED PROFILE PICTURE SELECTION

BACKGROUND

Many services exist that support any of various forms of messaging. Example messaging service types include chat messaging, text messaging, instant messaging, direct messaging, and micro-blogging. Other services whose core functionality is not centered on messaging may nevertheless incorporate messaging components or modules to support messaging as an ancillary function. Social networks, for instance, incorporate a messaging component enabling users to message each other. Web forums where people post to 'threads' are another form of messaging service. Many other kinds of messaging services exist.

Typically each user of a messaging service will have an account under which they exchange messages with other users and perform other activities. Messages can be one-on-one messages group messages, in which a message sent by a user is conveyed or otherwise viewable by several people of a group of which the user is a part, or public messages/posts. Many services allow a user to associate a picture, avatar, icon, or other form of user/account profile picture with the user's account. The profile picture is displayed to the other users of the service in any of various interfaces, for instance in a messaging session with the user, a profile or directory entry for the user, or in a list of friends or contacts. A user's profile picture is often set by the user as a single, static image and conveyed to other users of the messaging service.

Some example features in messengers allow a user to set the picture that the user sees for a given person (e.g. User A sets a picture that User A sees for User B). In these examples, only User A will see that picture for User B; it is unrelated to any picture that user B may have set for himself in his own settings, and unrelated to what other users have selected to show for user B on their end. Accordingly, existing approaches fail to provide enhanced options for profile picture selection and settings.

SUMMARY

Shortcomings of the prior art are overcome and additional advantages are provided. There may be a certain profile picture that User A wants only User B or a group of users to see. For example, user A might feel uncomfortable setting a photo of his face as his profile picture because he does not want everyone using the messaging service to see his face. There may, however, be one or many specific people, or a group of people, with whom user A is comfortable sharing a picture of his face as his profile picture. Aspects described herein can provide this functionality, whereas existing approaches could not. Contextually-selected provision of different profile pictures depending on the particular context is provided herein.

In an example, a computer-implemented method is provided. The method maintains a definition of a selection rule for a contextual parameter category upon which contextual messaging service profile picture selection is to be made for a first user of a messaging service. The method ascertains a current context under which a profile picture for the first user is to be conveyed to a messaging client of a second user of the messaging service. The current context indicates a parameter for the contextual parameter category. The method also, based on the ascertained current context and the selection rule, selects the profile picture for conveyance to the messaging client of the second user. Accordingly, this has an advantage in that a specific profile picture for the first user can be selected and conveyed to the second user based on context, and this may vary depending on the current context under which the profile picture is to be provided.

Further, a computer program product including a computer readable storage medium readable by a processor and storing instructions for execution by the processor is provided for performing a method. The method maintains a definition of a selection rule for a contextual parameter category upon which contextual messaging service profile picture selection is to be made for a first user of a messaging service. The method ascertains a current context under which a profile picture for the first user is to be conveyed to a messaging client of a second user of the messaging service. The current context indicates a parameter for the contextual parameter category. The method also, based on the ascertained current context and the selection rule, selects the profile picture for conveyance to the messaging client of the second user. Accordingly, this has an advantage in that a specific profile picture for the first user can be selected and conveyed to the second user based on context, and this may vary depending on the current context under which the profile picture is to be provided.

Yet further, a computer system is provided that includes a memory and a processor in communications with the memory, where the computer system is configured to perform a method. The method maintains a definition of a selection rule for a contextual parameter category upon which contextual messaging service profile picture selection is to be made for a first user of a messaging service. The method ascertains a current context under which a profile picture for the first user is to be conveyed to a messaging client of a second user of the messaging service. The current context indicates a parameter for the contextual parameter category. The method also, based on the ascertained current context and the selection rule, selects the profile picture for conveyance to the messaging client of the second user. Accordingly, this has an advantage in that a specific profile picture for the first user can be selected and conveyed to the second user based on context, and this may vary depending on the current context under which the profile picture is to be provided.

Additional aspects may be optionally provided. For instance:

The definition of the selection rule for the contextual parameter category may be part of a plurality of definitions of selection rules for one or more contextual parameter categories upon which the contextual messaging service profile picture selection is available to be made for the first user. The method can further include maintaining the plurality of definitions of the selection rules for the one or more contextual parameter categories. This has an advantage in that multiple different contextual parameter categories are support.

The method can also include prioritizing how the selection rules are to be applied in the contextual messaging service profile picture selection to select the profile picture. The selecting the profile picture may be further based on the prioritizing. This has an advantage in that certain selection rules can be emphasized as higher priority than others, given varying circumstances.

Selecting the profile picture can include selecting from a plurality of profile pictures for the first user, the plurality of profile pictures being available for simultaneous conveyance to other users. This has an advantage in that the several profile pictures may be made available for selection, where potentially different profile pictures may be conveyed to different targets or under different contexts at any given time.

A contextual parameter category may be user identity, where the selection rule indicates a particular profile picture to be selected based on an identity of the second user, where the selected profile picture is the particular profile picture indicated by the selection rule, and where users with different identities are associated with different profile pictures for the first user. This has an advantage in that the context under which the profile picture is selected and conveyed encompasses identity of the target recipient of the picture. Different targets may potentially receive different profile pictures for the user.

The indication of the particular picture may be made by reference to a user group in which the second user is grouped, where the selecting includes correlating the second user to the user group and selecting the particular profile picture based on the correlating. This has an advantage in that multiple targets (users) can be identified in the selection rules using a group designation, to easily manage selections to member of an entire group.

A contextual parameter category may be location of the first user, where the selection rule indicates a particular profile picture to be selected based on the location of the first user when conveyance of the selected profile picture to the messaging client of the second user is to be made, where the selected profile picture is the particular profile picture indicated by the selection rule, and where different locations are associated with different profile pictures for the first user. This has an advantage in that the context under which the profile picture is selected and conveyed encompasses location of the first user. When the first user is located in one location, the provided profile picture may be different than when the first user is in a different location. The particular profile picture may convey an image indicating the location, for instance.

A contextual parameter category may be current connection of a device of the first user, where the selection rule indicates a particular profile picture to be selected based on the current connection of the device when conveyance of the selected profile picture to the messaging client of the second user is to be made, where the selected profile picture is the particular profile picture indicated by the selection rule, and where different connections are associated with different profile pictures for the first user. This has an advantage in that the context under which the profile picture is selected and conveyed encompasses a consideration of the current connection to which the first user's device is connected. Connection may be significant of other indications, such as where the user is located or what the user may be doing as an activity. When the first user is connected to one connection, the profile picture provided may be different than when the first user is connected to another connection.

A contextual parameter category may be status of the first user, where the selection rule indicates a particular profile picture to be selected based on a current status of the first user when conveyance of the selected profile picture to the messaging client of the second user is to be made, where the selected profile picture is the particular profile picture indicated by the selection rule, and where different statuses are associated with different profile pictures for the first user. This has an advantage in that the context under which the profile picture is selected and conveyed encompasses a consideration of the first user's status. Status may be significant of what the user may be doing as an activity, for instance, and this may be used to select a profile picture depicting that activity. Different statuses can be associated with different profile pictures.

A contextual parameter category may be current time, where the selection rule indicates a particular profile picture to be selected based on a current time when conveyance of the selected profile picture to the messaging client of the second user is to be made, where the selected profile picture is the particular profile picture indicated by the selection rule, and where different times are associated with different profile pictures for the first user. This has an advantage in that the context under which the profile picture is selected and conveyed encompasses a consideration of the current time. Different profile pictures may be selected and conveyed at different times.

The selecting can include dynamically constructing the profile picture for the first user by overlaying an image over an existing profile picture for the user. This has an advantage in that the user need not predefine every profile picture; one can be dynamically constructed, for instance using real-time information, such as current location or weather information as examples, that are not available beforehand.

The method can further include storing, on a messaging server through which conveyance of the profile picture to the messaging client of the second user is to be made, a definition of at least one selection rule for each contextual parameter category of a plurality of contextual parameter categories as profile picture settings for the first user, where the messaging server performs the selecting the profile picture using the stored profile picture settings for the first user. This has an advantage of placing the selection and related processing under control of the server. Additionally or alternatively, the method may include storing, on a device of the first user, a definition of at least one selection rule for each contextual parameter category of a plurality of contextual parameter categories as profile picture settings for the first user, where the device of the first user performs the selecting the profile picture using the stored profile picture settings for the first user and provides an indication of the selected profile picture to a messaging server through which conveyance of the profile picture to the messaging client of the second user is to be made. The indication provided to the server in this case could be an indication of which picture, already stored on the server, to use, or may include the selected profile picture itself, where the server does not separately store it or maintain it. This has an advantage in that the user's device, rather than the sever, can house the information for the selection and optionally the profile pictures themselves, which may be advantageous for security reasons, e.g. the user retains control and possession of the rules and the pictures. Additionally, details about the first user's contextual parameters would not need to be provided to the server in this case since the user device performs the selection.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 2 depicts example profile picture settings for a user, in accordance with aspects described herein;

DETAILED DESCRIPTION

Described herein are facilities for targeted profile picture selection and provision based on contextual parameters. It is understood that a user profile picture (the 'profile picture for that user') need not necessarily be a photo of the user; it can be any picture, graphic, or the like that the user wants to target to a person/group. It may be an icon, animation, cartoon, avatar, or photograph of something other than the user.

This addresses a problem of being unable to provide different profile pictures under different contexts, such as different target users. There are limitations in existing offerings as to the profile picture for the user. Typically the user can select only a single profile picture that is to be conveyed to other users. In contrast, and in accordance with aspects described herein, features are provided that give the user granular control for the selection of potentially several different profile pictures to be conveyed to other users in specified circumstances. A user can specify selection rule(s) to use for one or more contextual parameter categories available upon which selection may be made. The selection rules inform a profile picture that is to be provided to another user of a messaging service. In this manner, and in some embodiments, different target users of the messaging service will see different profile pictures for the user depending on the selection rule(s) that are being applied to determine which profile picture(s) to convey. The contextual parameters themselves as well as the respective selection rule(s) thereof can be prioritized in terms of how they are applied to determine which profile picture of potentially several to provide to a target user. Contextually-selected provision of different profile pictures depending on the particular context is provided.

Thus, in some aspects, a User A is able to set a first profile picture for conveyance to user B (i.e. for display in a messaging client of user B so that user B sees the first profile picture as the profile picture for user A), and a second, different, profile picture for conveyance to user C (i.e. for display in a messaging client of user C so that user C sees the second profile picture as the profile picture for user A).

The above applies to user groups and different contexts as well, allowing the user to set a respective specific image to be used for each viewer or group of viewers, or for the image conveyed to be specified based on other contextual parameters at the time the profile picture is to be viewed.

Example messaging services that may incorporate or use aspects described herein include those noted previously, e.g. instant messaging, social media messaging/chat, forums, text messaging, or any other messaging services where users have an account or other form of profile and an associated profile picture.

Figure 1:
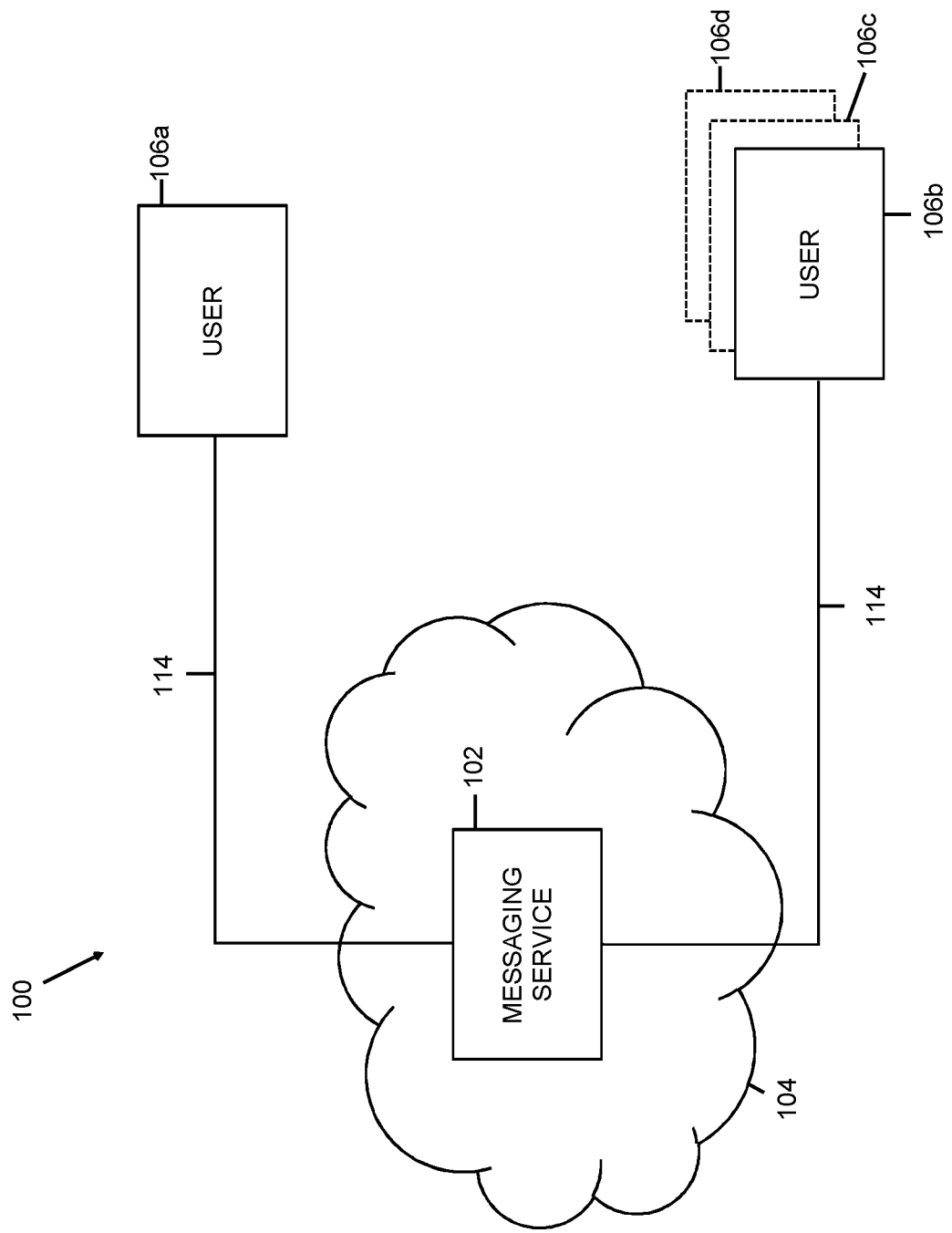
FIG. 1 depicts an example environment to incorporate and use aspects described herein.

FIG. 1 depicts an example environment 100 to incorporate and use aspects described herein. Environment 100 includes a messaging service 102 providing facilities for users to interact by sending messages to each other. As noted previously, any of various messaging services may be used, and in some examples, messaging service 102 is incorporated into another service, such as a social network offering. The messaging service 102 is hosted in a cloud environment 104 or other network infrastructure, for instance on messaging server(s) thereof represented by 102. Users 106a-106d communicate with the messaging service, e.g. via computer systems represented by 106a-106d that connect to the internet or other network to access the messaging service. As an example, a user uses a computer device of the environment 100 to interact with one or more other users via the messaging service, for instance to send/receive messages and retrieve profile and status information of other users. A user device will have a client software installed that enables the user of the device to interact with the messaging service and other users thereof. In some examples, the messaging client is a web browser, in which the user navigates to a website an engages with the messaging service (a forum, social media network, etc.) via that website. In other examples, the messaging client on a user device is a mobile application ("app") or other specialized application installed on the client device.

The components in FIG. 1 form wired or wireless network(s) of devices, and communication between the devices takes place via wired or wireless communications links 114 for communicating data between the devices. FIG. 1 is just one example of an environment to incorporate and use aspects described herein; many other examples are possible and contemplated as being compatible with the capabilities described herein.

As explained in further detail below, a user can define a respective at least one selection rule for each of one or more contextual parameter categories. These can be defined using the user's device, for instance an app or other software thereof. The user can supply input that directs a computer system in selecting which profile picture to target to other user(s) and/or under which contexts each of multiple different profile pictures are to be provided to given users. The selection rule(s) can dictate which profile picture of possibly several should be conveyed to one or more other users. This information can be stored as profile picture settings for the user. This information can be used when the system is to convey a profile picture of one user (the subject user) to another user (a target user) in the system. Such conveyance may occur for a variety of reasons, for instance when a new conversation is started between the users, when a new message in an existing conversation or session is provided to the target user, when a target user views a profile or status of the subject user, or when the target user views a list or collection of contacts, friends, or other groups of individuals in the target user's messaging client, as examples.

In a particular example, a server, such as a messaging server of messaging service 102, stores and/or has access to the profile picture settings for users of the messaging service. When the server is to convey a profile picture for a subject user (e.g. 106a) to a target user (e.g. 106b), the server accesses the profile picture settings and uses them to select a profile picture for the subject user to convey to the target user's messaging client for display. The server selects which image to convey/display for the particular target user.

As an alternative, the profile picture settings may be maintained on the client side, e.g. a computer system of user 106a. When selection and conveyance of a profile picture for user 106a is desired, the device of user 106a could make the selection using the locally stored profile picture settings for user 106a. Depending on where the profile pictures are stored, the process proceeds accordingly. If the server stores or can access the collection of available profile pictures for user 106a, the client device could provide a signal or other indication to the server indicating which profile picture for user 106a is to be conveyed to the target user 106b. The server then accesses that picture and conveys it to the target 106b. Alternatively, if the subject user's (106a) client/device maintains the profile pictures, it can select the profile picture to convey and push that to the server for conveyance to the target, or push it directly to the target if desired.

FIG. 2 depicts example profile picture settings 200 for a user, in accordance with aspects described herein. Different contextual parameter categories are provided upon which contextual messaging service profile picture selection for user A can be made. User A, through a definition of selection rule(s) for each of one or more such categories, specifies which profile picture is to be selected for conveyance under different circumstances. The selection rules in FIG. 2 are the lines beginning with "-Picture to use for". The user's definition implicitly makes a selection of which one or more contextual parameters categories are relevant in terms of selection of a profile picture for the user to convey to a target user. A prioritization as to how the categories and selection rules thereof are applied is also contemplated, as explained below.

USER IDENTITY 202 is one contextual parameter category, indicating by way of two selection rules which profile picture for User A to convey to a given target user. Referring to FIG. 2, the User A profile picture to use (convey, provide, send, display) to User B is image1.jpg and the picture to use for another user Spouse, is image2.png. As an example, User B might be User A's employer and a more formal picture may be desired to show to the employer than the picture to show to User A's spouse. In some examples, if a target user is not covered by any selection rule under the USER IDENTITY contextual parameter category, a default picture may be used.

Another contextual parameter category is LOCATION 204. This enables the profile picture conveyed to depend at least in part on a location from which User A is connected to the messaging service, e.g. a location where User A's device is located at the time selection is to be made. In the example of FIG. 2, the settings specify one specific location parameter "Home". Home is a contextual parameter, in this case for the contextual parameter category LOCATION. If the user is located at Home, then the picture to use for everyone is image3.gif, the picture to use for group C (i.e. the users who are members of that group) is image2.jpg, which happens to be the picture specified in the above selection rule for the user's Spouse, and the picture to use for specific User B is image5.jpg. It is noted that a priority as between the selection rules of this category LOCATION (or specific location parameter Home) may be implied, for instance as a default or by the order in which they are listed, or explicitly defined by User A. For instance, when at Home, the priority in terms of selecting the picture to use follows: a user-specific, followed by a group membership, followed by a global (everyone) definition. Thus, user D, who does not have a user-specific definition and who is not in group C, will see image3.gif as User A's profile picture. User E, who is in group C, will see image2.png as User A's profile picture, and user B will see image5.jpg as User A's profile picture regardless of whether user B is in group C because a user-specific designation as priority over a Group designation.

Group definition provides flexibility in targeting a collection of users. A group could be delineated by any desired parameters. The group could be explicitly defined by User A, a location (all users who are located within 100 feet of User A for instance), or a relationship (e.g. whether User A has added back the target user as a "friend"), as examples.

It is noted that a priority as between categories 202 and 204 may be handled however desired. For instance, and ignoring for the moment the additional profile picture settings below the Home parameter of the LOCATION category, it may be desired that USER IDENTITY 202 be evaluated first so that, regardless of whether user A is located at home, user B receives image1.jpg, Spouse receives image2.png, and profile picture selection will look at the LOCATION rules for any other user not covered under any USER IDENTITY selection rule. Priority may be implied based on their order (user identity appears above location) or on a default (user identity always takes precedence over location regardless of their order in the settings). Alternatively, priority may be defined by the user in some manner.

As an alternative, and again ignoring for the moment the additional profile picture settings below the LOCATION category, the profile settings may be read to indicate that if the user is located at Home, then the selection rules under Home are to be followed, otherwise the settings under USER IDENTITY are to be followed. Thus, if User A is located at home when User B is to receive User A's profile picture, then user B receives image5.jpg and Spouse receives either image3.gif or image2.png depending on whether Spouse is a member of Group C, otherwise if User A is not located at home, then User B receives image1.jpg and Spouse receives image2.png.

In particular usages of the LOCATION category, the picture to use for given target(s) is dependent on the country from which that the subject user—User A in the example of FIG. 2—is connected. For instance, the profile picture may automatically have an image overlay that corresponds to the location. Thus, when User A is connected from Switzerland, User A's profile picture may automatically be or include the flag of Switzerland, for example in one corner of the picture. Optionally, the flag may be overlaid onto a base picture that is modified dynamically to include the flag of Switzerland based on the user's presence in Switzerland. Additionally or alternatively, the entire profile picture may be selected dynamically (as the flag or otherwise) based on the user's location. For instance, when user A is connected from Sydney, Australia, regardless of whether the user has a default profile picture set, the profile picture can be automatically selected as a photo of a landmark such as the Sydney Opera House.

In some examples the selected profile picture could be implemented as an overlay of some static or other picture. When the context for profile picture selection accounts for the user's feelings or mood, then an overlay may be a sad face on a static image. When the context accounts for current weather (for instance weather at a location where the user is present), an animation of a current weather condition (rain) may be applied to a base image. In some examples, this overlay is provided on a specific profile picture selected according to aspects described herein (e.g. image1.jpg for User B and image2.png using FIG. 2). Thus, the selection of the profile picture could be or include a dynamic modification to an existing picture or image to introduce an overlay, and in this sense, the selected profile picture could be a dynamically generated profile picture and would not necessarily need to have been pre-defined by the subject user.

Continuing with the explanation of FIG. 2, another contextual parameter category of STATUS 206 is provided nested within the LOCATION category. STATUS of the user, such as a status set in the messaging service, can be accounted-for and mapped to given profile pictures. The picture to use may correlate to the user's status. Here, the particular status of the user is the contextual parameter being evaluated. When User A's posted or selected status is "Running on Treadmill", the picture to use is image6.jpg, which picture may correlate to that activity. It may be a picture of User A or another person running on a treadmill, for instance. Alternatively, when User A's posted or selected status is "Making Dinner", the picture to use is image7.jpg, which picture may correlate to that activity of making dinner. It is noted that STATUS is nested within the LOCATION category. Although a given STATUS does necessarily relate to a specific LOCATION, its provision in conjunction within a location means that it may not be more generally applicable to other categories like USER IDENTITY. As one example, the settings could be read as: If the user is located at Home, use the selection rules beneath the Home parameter (pictures to use for everyone, group C and user B), otherwise, for all other locations, select picture to convey to targets based on User A's STATUS. Since there are only two statuses specified in the example of FIG. 2, there may be a default profile picture to apply if User A's current status is other than one of the two specified. As another example, the settings could be read as: If User A's status matches either of the two specified, use the corresponding image (6 or 7), otherwise if the user is Home, use the images specified by the selection rules beneath the Home parameter, otherwise apply a default.

TIME 208 is also another contextual parameter category, also nested within the LOCATION category 204 in this example. Here, depending on the local time of User A's device (local time being the parameter evaluated in this category), the profile picture can automatically be selected as, or have an image overlay of, something that corresponds to the current time. In FIG. 2, if the current time is between 11:00 PM and 6:00 AM, the profile picture to use for user A to provide to target(s) is image8.jpg, which may be a picture of someone sleeping, for instance. In an example where an overlay is applied to an image, if User A is online at 5:00 PM the profile picture to provide may have a light overlay image of the sunset, and when User A is online at 7:00 PM the profile picture may have a light overlay image of the night sky and stars. The intensity/pattern of the overlay may be determined by the current time of day for instance the overlay of the night sky and stars may be more intense at 1:00 AM than at 7:00 PM.

In the example of FIG. 2, the nesting of TIME under LOCATION may be significant because if the user is Home, it may be implied that the user is sleeping between 11:00 PM and 6:00 AM and a profile picture depicting sleep is appropriate, but if the user is not home, the user may be more likely to be on a deviated sleep schedule and therefore not necessarily sleeping at that time. Thus, the prioritization may read TIME to apply only when the user is located at Home. In other examples, TIME may be read to apply only when the user is located anywhere other than at Home.

Selection rules for a CONNECTION contextual parameter category are also shown in FIG. 2. Connection can refer to a current connection of the device of User A. So, depending on status (connected vs. disconnected; connected to specific network; etc.), the profile picture for User A to be conveyed to other users may vary accordingly. In FIG. 2, User A has set the selection to use image9.jpg (a picture of User A driving his car) when User A's device is connected to the "Car Bluetooth" connection, referring to user A's Bluetooth connection to his car. User A has also set the selection to use image10.jpg (a picture of a log cabin) when User A's device is connected to the "Cabin Wi-Fi" connection, referring to User A's wireless network at his cabin. As further examples of connection-based contextual messaging service profile picture selection, when User A is connected to his work's wireless network, his profile picture is one of him in the office, when User A is connected to his home wireless network, his profile picture to convey is one of him at home, when User A is connected to a 4G network and not to a Wi-Fi network, his profile picture to convey is one of him on a train, and when User A is connected to a Bluetooth hands-free headset, his profile picture is one of him wearing the headset.

Though FIG. 2 depicts each of five contextual parameter categories being used once each, this is merely coincidental—it is possible to reuse categories. For instance, a user may define applicable LOCATIONs (Home, Work, and Everywhere Else), and then within each location, include unique USER IDENTITY, STATUS, or other parameters if applicable. So, to illustrate, User A's profile picture to provide to target User C may be different depending on whether User A is running on a treadmill while at home vs. while at the gym.

In some examples, the parameter of a contextual parameter category could be with reference to a target user, rather than the subject user. By way of specific example, User A could specify that when the target user, e.g. a coworker of User A, is located at work, the profile picture, for user A, to convey to User B's messaging client is a picture of user A at work. In other examples, the current time or connection of the target user's device, or the target user's status, is what is evaluated when applying User A's selection rules.

It is noted that time-based, status-based, connection-based, user identity based, and/or location-based selections are just examples of the contextual selections that may be made. Various other contextual parameter categories may be available for the user to use in defining what profile pictures to provide under different contexts to different users. In addition, and as noted above, the prioritization in terms of how the selection rule(s) in the category/categories employed in the profile picture settings are applied in the contextual messaging service profile picture selection for the user can follow any desired prioritization, which may be specified by the user as part of its definition, may be defaulted to an order in which they are listed in the settings, or may follow some syntactical priority built into the syntax of the settings specification, as examples.

Advantageously, a specific profile picture for a user can be selected and conveyed to target(s) based on context. Context can encompass, among other categories, the specific user or group to whom the profile picture is being displayed, the network to which the user's device is connected (e.g. when connected to a certain wireless network name, such as the user's work Wi-Fi), the Bluetooth or other device(s) to which the user's device is connected (e.g. a certain profile picture is to be shown when a certain Bluetooth device name is connected to the user's device), the local time of the users device he is connected (a given profile picture to be shown at/during a specific time, 9:00 PM), user status, and/or a location from which the user is connected (e.g. a specific country, state, city, area, or other delineation). An embodiment where the user identity contextual parameter category is one of the contextual parameter categories that the subject user specifies to be included in the context considered when selecting the profile picture to be conveyed to a target user has an advantage that different target users may receive different profile pictures, even if conversing with the subject user, viewing a profile of the subject user, etc. at a same time. Additionally, an embodiment where the multiple contextual parameter categories, including the user identity contextual parameter category together with one or more others, are to be included in the context considered when selecting the profile picture to be conveyed to a target user has an advantage that what is considered is not only the particular target user to receive the picture but additional contextual parameters, such as location, connection, status, or time, as examples. This provides granularity and flexibility to the subject user to define who receives which pictures and under which different circumstances.

In prior art approaches, the user is unable to specify which image is used for a given viewer. In accordance with aspects described herein, the subject user can predefine, through selection rule(s), which profile picture(s) are to be displayed under different contexts, for instance to different target users.

Figure 3:
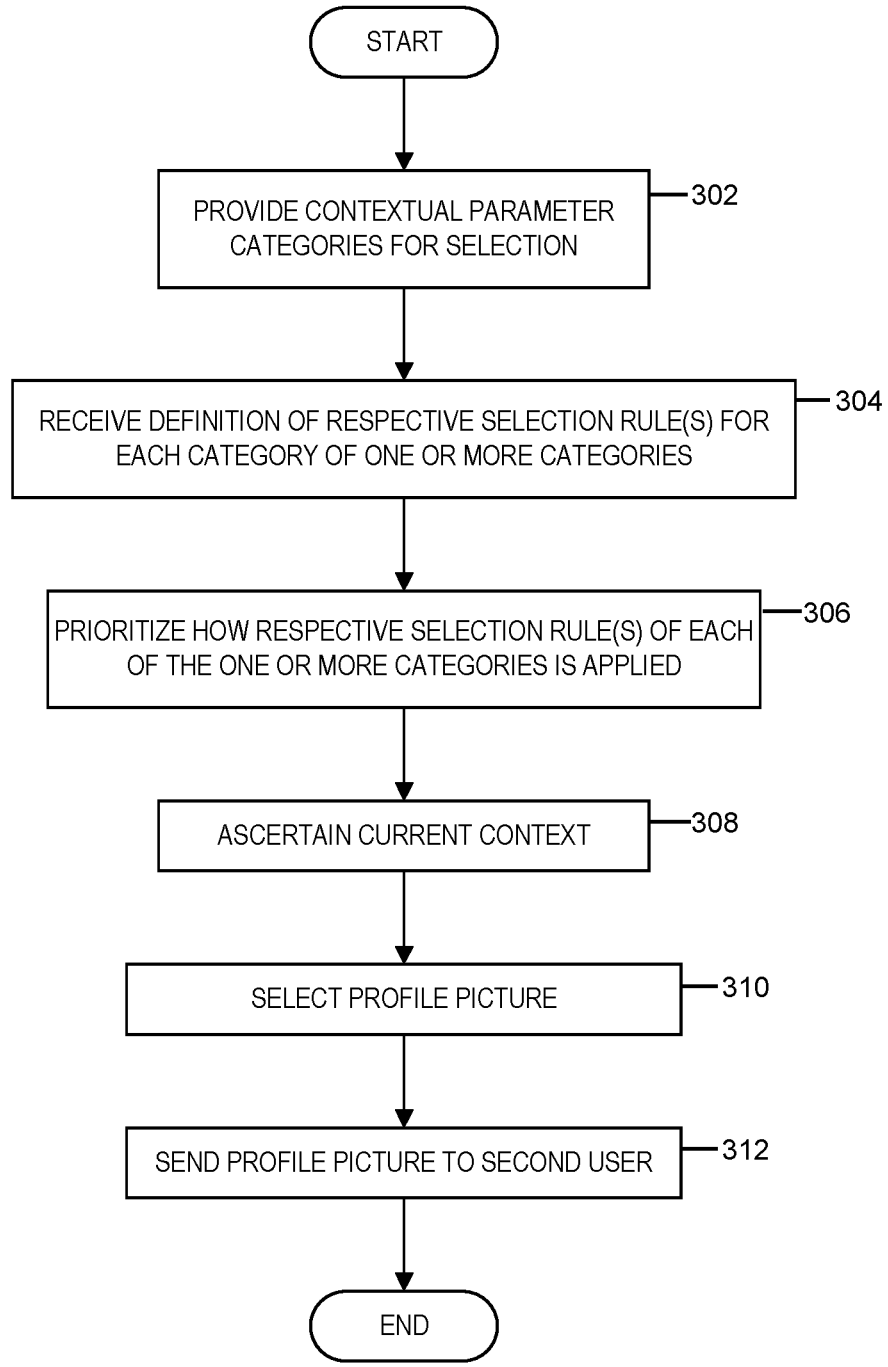
FIG. 3 depicts an example process for targeted profile picture selection, in accordance with aspects described herein.

FIG. 3 depicts an example process for targeted profile picture selection, in accordance with aspects described herein. In some examples, the process is performed one or more computer systems, such as those described herein, which may include one or more cloud servers, for instance servers of a messaging service, one or more user computer systems, such as a mobile device or personal computer, and/or one of more other computer systems. In particular examples, processing described herein may be performed by a software module, component, or the like installed in a messaging server of a messaging service.

The process of FIG. 3 begins by providing for a first user of a messaging service a plurality of contextual parameter categories upon which contextual messaging service profile picture selection for the first user is available to be made (302). By providing is meant that the system supports selection rules defined for any of those contextual parameter categories, meaning that the user can utilize one or more of these contextual parameter categories to define contexts under which different profile picture selection is to take place. The system might provide those categories in an app or other interface that the user can use to select the categories desired, define the selection rules, and save this as profile picture settings.

The process of FIG. 3 continues by receiving, from the first user, a definition of a respective at least one selection rule for each contextual parameter category of one or more contextual parameter categories of the plurality of contextual parameter categories (304). Thus, for each contextual parameter category or one or more, the process receives a respective one or more selection rules for that category. It is noted that a given category may be used more than once in a profile picture settings definition, for instance in different overriding contexts (e.g. status related selection rules for each location of locations 1 and 2), and therefore the selection rules may include multiple sets of selection rules potentially for a same category. The definition may be received from the user via a configuration interface of an app or other program, as an example. The process prioritizes how the respective at least one selection rule of each of the one or more contextual parameter categories is applied in contextual messaging service profile picture selection for the first user (306). The prioritization may be automatically applied based on defaults or syntactically implied priorities, as examples, and/or may be directed by the user, where the prioritizing is made according to user specification. Supporting user specification off the priority has an advantage of providing flexibility to the user to specify how and in what order the selection rules are to be applied in the selection of the profile picture. In any case, the prioritization may be carried out by processing of a computer system, such as a messaging server or client device, when parsing the profile picture settings to select a profile picture to convey.

The process also ascertains a current context under which a selected profile picture for the first user is to be conveyed to a messaging client of a second user of the messaging service (308). Though shown as being performed after prioritization of the selection rules, in practice this ascertaining of the context may be made at any desired time. The current context can indicate a respective parameter for each of the one or more contextual parameters categories (i.e. for which respective selection rules(s) were defined by the subject user). Thus, in one example, the current context informs of target user(s) (user identity parameters) for the conveyance, which may be users to which a message is directed, in some examples. Other example parameters indicated by context include time of day, location, status of the user, and connection status of the client device, though many other types of parameters are possible. It is also noted that in this aspect the 'selected profile picture for the first user . . . to be conveyed to a messaging client' has not yet been selected. Instead, this aspect refers to the fact that some to-be-selected profile picture for the first user is to be conveyed to the second user. The current context being ascertained will subsequently be used to assist in that selection of the selected profile picture to convey.

Accordingly, based on the prioritizing and the ascertained current context, the process the selects the profile picture for conveyance to the messaging client of the second user (310). The selecting the profile picture can include selecting from a plurality of profile pictures for the first user, the plurality of profile pictures each being available for simultaneous conveyance to other users. In other words, one profile picture for the first user may be provided to the second user while other profile picture(s) may be conveyed to other users when requested. This has an advantage in that the several profile pictures may be made available for selection, where potentially different profile pictures may be conveyed to different targets or under different contexts at any given time. Additionally or alternatively, each of the plurality may be available for conveyance under different contexts, which may or may not account for the target user. By 'simultaneous' is meant that at any given time, the profile picture that would be selected for conveyance to one target user or under one context may be different than the profile picture that would be selected for conveyance to another target user or under a different context.

Additionally or alternatively, the selecting the profile picture can include dynamically constructing the profile picture for the first user by overlaying an image over an existing profile picture for the user. As one example, a weather condition, lighting filter, semi-transparent image, or other overlay may be placed over another image to dynamically construct the profile picture. The user advantageously need not necessarily predefine every profile picture that would be conveyed; the system can dynamically construct one using current context (weather, location of the user, etc.). One can be dynamically constructed, for instance using real-time information, such as current location or weather information as examples, that are not available beforehand.

The process of FIG. 3 continues by sending the selected profile picture to the messaging client of the second user (312), and ending. This process of FIG. 3 has an advantage in that a specific profile picture for the first user can be selected and conveyed to the second user based on context, and this may vary depending on the current context under which the profile picture is to be provided.

A contextual parameter category of the one or more contextual parameter categories can be user identity. The at least one selection rule for the user identity contextual parameter category can indicate a particular profile picture to be selected based on an identity of the second user, where the selected profile picture is the particular profile picture indicated by the at least one selection rule. Thus, first user can define a selection rule indicating that the second user is to receive image2 as the first user's profile picture. Users with different identities may be associated with different profile pictures for the first user. This has an advantage in that the context under which the profile picture is selected and conveyed encompasses identity of the target recipient of the picture. Different targets may potentially receive different profile pictures for the user.

The indication of the particular picture is made in some examples by reference to a user group in which the second user is grouped. For instance, the second user may be a member of a group C. The selecting can include correlating the second user to the user group and selecting the particular profile picture based on the correlating. In this manner, the selection rule might indicate that group C is to receive image2 as the first user's profile picture, and the process might correlate the second user to group C, thus determining that the second user is to receive image2 on account of the second user's inclusion in group C. This has an advantage in that multiple targets (users) can be identified in the selection rules using a group designation, to easily manage selections to member of an entire group.

Additionally or alternatively, a contextual parameter category of the one or more contextual parameter categories may be location of the first user, where the at least one selection rule for the location contextual parameter category indicates a particular profile picture to be selected based on the location of the first user when conveyance of the selected profile picture to the messaging client of the second user is to be made. The selected profile picture may be the particular profile picture indicated by the at least one selection rule. Different locations may be associated with different profile pictures for the first user. For example, a different profile picture may be conveyed when the user is in location 1 than the profile picture conveyed when the user is in location 2. This has an advantage in that the context under which the profile picture is selected and conveyed encompasses location of the first user. When the first user is located in one location, the provided profile picture may be different than when the first user is in a different location. The particular profile picture can in some examples convey an image indicating the location. For instance, the profile picture may have a country's flag when the first user is located in that country. Or the profile picture might have a picture of the location or an object, building, or the like at that location, and that could be recognized by the target user to ascertain the location of the first user.

Additionally or alternatively, a contextual parameter category of the one or more contextual parameter categories may be current connection of a device of the first user. The at least one selection rule for the current connection contextual parameter category can indicate a particular profile picture to be selected based on the current connection of the device when conveyance of the selected profile picture to the messaging client of the second user is to be made. The selected profile picture is the particular profile picture indicated by the at least one selection rule (e.g. user image 3 when connected to home Wi-Fi network), and different connections may be associated with different profile pictures for the first user. This has an advantage in that the context under which the profile picture is selected and conveyed encompasses a consideration of the current connection to which the first user's device is connected. Connection may be significant of other indications, such as where the user is located or what the user may be doing as an activity. When the first user is connected to one connection, the profile picture provided may be different than when the first user is connected to another connection.

Additionally or alternatively, a contextual parameter category of the one or more contextual parameter categories may be status of the first user, where the at least one selection rule for the status contextual parameter category indicates a particular profile picture to be selected based on a current status of the first user when conveyance of the selected profile picture to the messaging client of the second user is to be made. The selected profile picture may be the particular profile picture indicated by the at least one selection rule, and different statuses may be associated with different profile pictures for the first user. This has an advantage in that the context under which the profile picture is selected and conveyed encompasses a consideration of the first user's status. Status may be significant of what the user may be doing as an activity, for instance, and this may be used to select a profile picture depicting that activity. Different statuses can be associated with different profile pictures.

Additionally or alternatively, a contextual parameter category of the one or more contextual parameter categories may be current time, where the at least one selection rule for the current time contextual parameter category indicates a particular profile picture to be selected based on a current time when conveyance of the selected profile picture to the messaging client of the second user is to be made. The selected profile picture may be the particular profile picture indicated by the at least one selection rule, and different times may be associated with different profile pictures for the first user. This has an advantage in that the context under which the profile picture is selected and conveyed encompasses a consideration of the current time. Different profile pictures may be selected and conveyed at different times.

A definition of the respective at least one selection rule for each contextual parameter category may be stored as profile picture settings for the first user on a messaging server through which conveyance of the profile picture to the messaging client of the second user is to be made. The messaging server can perform the selecting the profile picture using the stored profile picture settings for the first user. This has an advantage of placing the selection and related processing under control of the server. Alternatively, the definition of the respective at least one selection rule for each contextual parameter category may be stored on a device of the first user as profile picture settings for the first user. The device of the first user can perform the selecting the profile picture using the stored profile picture settings for the first user and can provides an indication of the selected profile picture to a messaging server through which conveyance of the profile picture to the messaging client of the second user is to be made. This has an advantage in that the user's device, rather than the sever, can house the information for the selection and optionally the profile pictures themselves, which may be advantageous for security reasons, e.g. the user retains control and possession of the rules and the pictures. Additionally, details about the first user's contextual parameters would not need to be provided to the server in this case since the user device performs the selection.

Figure 4:
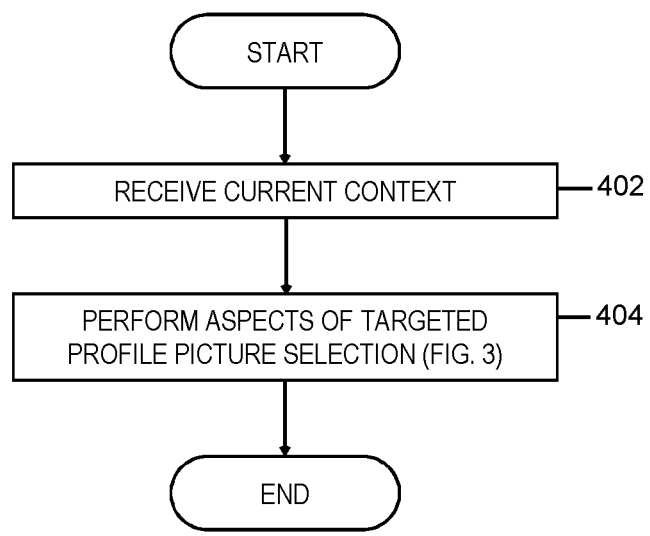
FIG. 4 depicts example processing of a server of a messaging service, in accordance with aspects described herein.

FIG. 4 depicts example processing of a server of a messaging service, in accordance with aspects described herein. The process may be performed by software executing on the server, for instance. The process includes the server receiving a current context from a client computer system (402) such as a mobile device or other computer system of a user. The current context received by the server can include contextual parameters that describe the current context, for instance an indication of client device location, current time, user status, connection status of the client device, and the like. The server can then perform (404) one or more aspects of the targeted profile picture selection processing of FIG. 3, for instance aspects 304 through 312, to select and send the appropriate profile picture to the second user.

Figure 5:
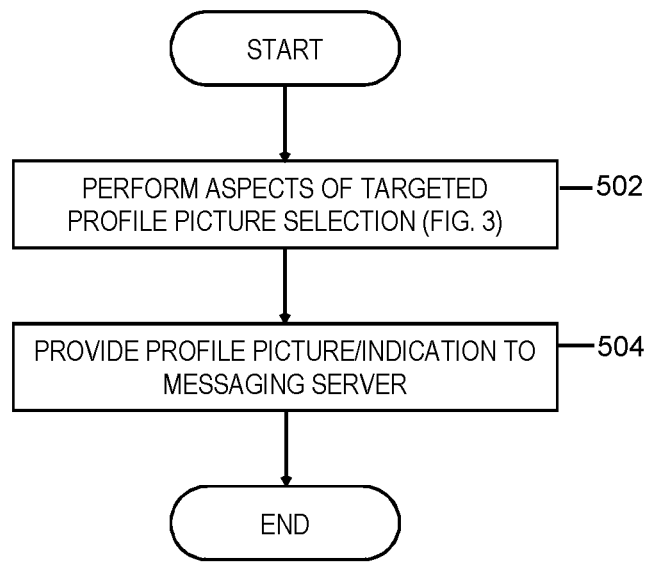
FIG. 5 depicts example processing of a computer system of a user of a messaging service, in accordance with aspects described herein.

FIG. 5 depicts example processing of a computer system of a user of a messaging service, in accordance with aspects described herein. The computer system of the user may be a mobile device or other computer system of the user, and the processing may be performed by software executing on that system. The process includes performing (502) one or more aspects of the targeted profile picture selection processing of FIG. 3, for instance aspects 302 through 310. The process can also provide (504) the selected profile picture to the messaging server for conveyance to the user, after which the server conveys the picture to the user, or the process provides to the server an indication of the profile picture to use, which the server correlates to a profile picture stored with the server or generates the profile picture dynamically. The server then conveys the profile picture to the second user (506).

Although various examples are provided, variations are possible without departing from a spirit of the claimed aspects.

Figure 6:
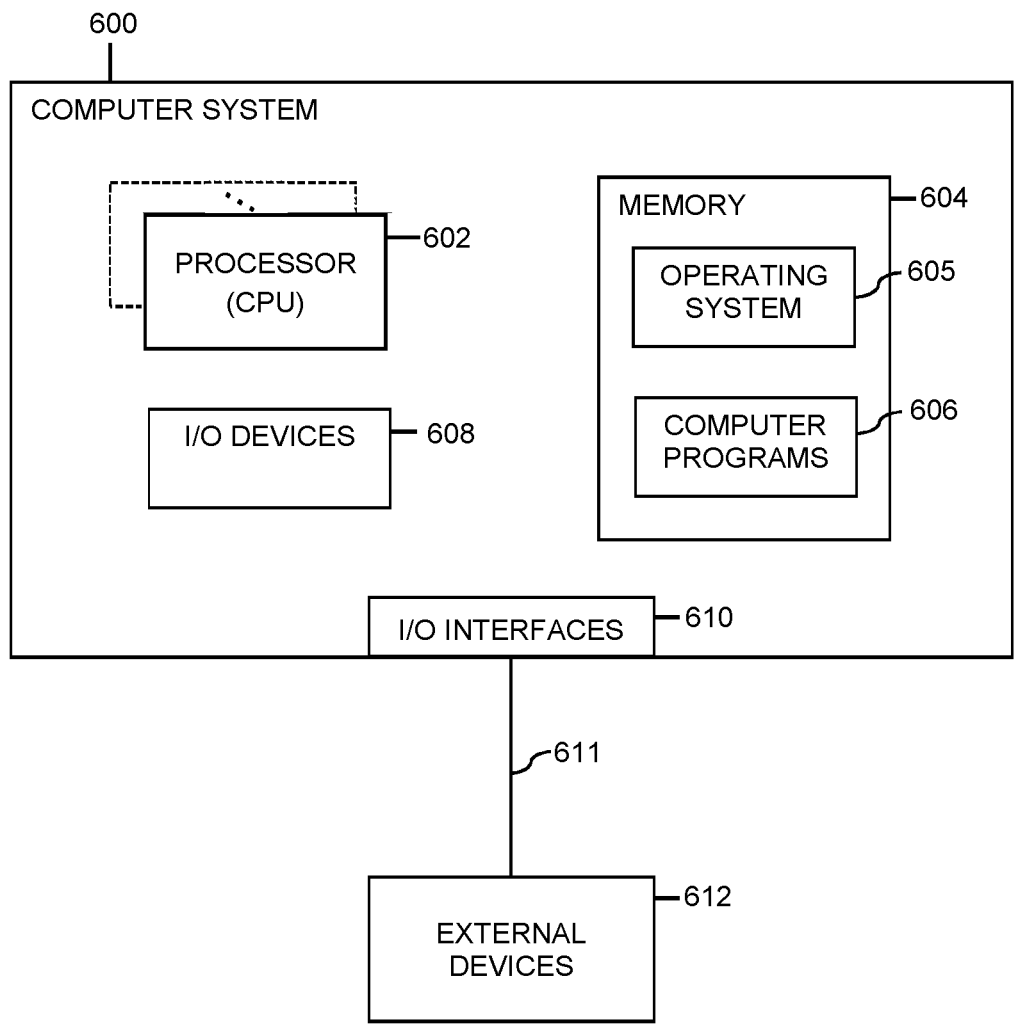
FIG. 6 depicts one example of a computer system and associated devices to incorporate and/or use aspects described herein.

Processes described herein may be performed singly or collectively by one or more computer systems, such as one or more messaging servers, client computing devices, or a combination of the foregoing, as examples. FIG. 6 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 6 shows a computer system 600 in communication with external device(s) 612. Computer system 600 includes one or more processor(s) 602, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 602 can also include register(s) to be used by one or more of the functional components. Computer system 600 also includes memory 604, input/output (I/O) devices 608, and I/O interfaces 610, which may be coupled to processor(s) 602 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 604 can be or include main or system memory (e.g. Random Access Memory) used in the execution of program instructions, storage device(s) such as hard drive(s), flash media, or optical media as examples, and/or cache memory, as examples. Memory 604 can include, for instance, a cache, such as a shared cache, which may be coupled to local caches (examples include L1 cache, L2 cache, etc.) of processor(s) 602. Additionally, memory 604 may be or include at least one computer program product having a set (e.g., at least one) of program modules, instructions, code or the like that is/are configured to carry out functions of embodiments described herein when executed by one or more processors.

Memory 604 can store an operating system 605 and other computer programs 606, such as one or more computer programs/applications that execute to perform aspects described herein. Specifically programs/applications can include computer readable program instructions that may be configured to carry out functions of embodiments of aspects described herein.

Examples of I/O devices 608 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (612) coupled to the computer system through one or more I/O interfaces 610.

Computer system 600 may communicate with one or more external devices 612 via one or more I/O interfaces 610. Example external devices include a keyboard, a pointing device, a display, and/or any other devices that enable a user to interact with computer system 600. Other example external devices include any device that enables computer system 600 to communicate with one or more other computing systems or peripheral devices such as a printer. A network interface/adapter is an example I/O interface that enables computer system 600 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 610 and external devices 612 can occur across wired and/or wireless communications link(s) 611, such as Ethernet-based wired or wireless connections. Example wireless connections include cellular, Wi-Fi, Bluetooth®, proximity-based, near-field, or other types of wireless connections. More generally, communications link(s) 611 may be any appropriate wireless and/or wired communication link(s) for communicating data.

Particular external device(s) 612 may include one or more data storage devices, which may store one or more programs, one or more computer readable program instructions, and/or data, etc. Computer system 600 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 600 may be operational with numerous other general purpose or special purpose computing system environments or configurations. Computer system 600 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 7.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 7:
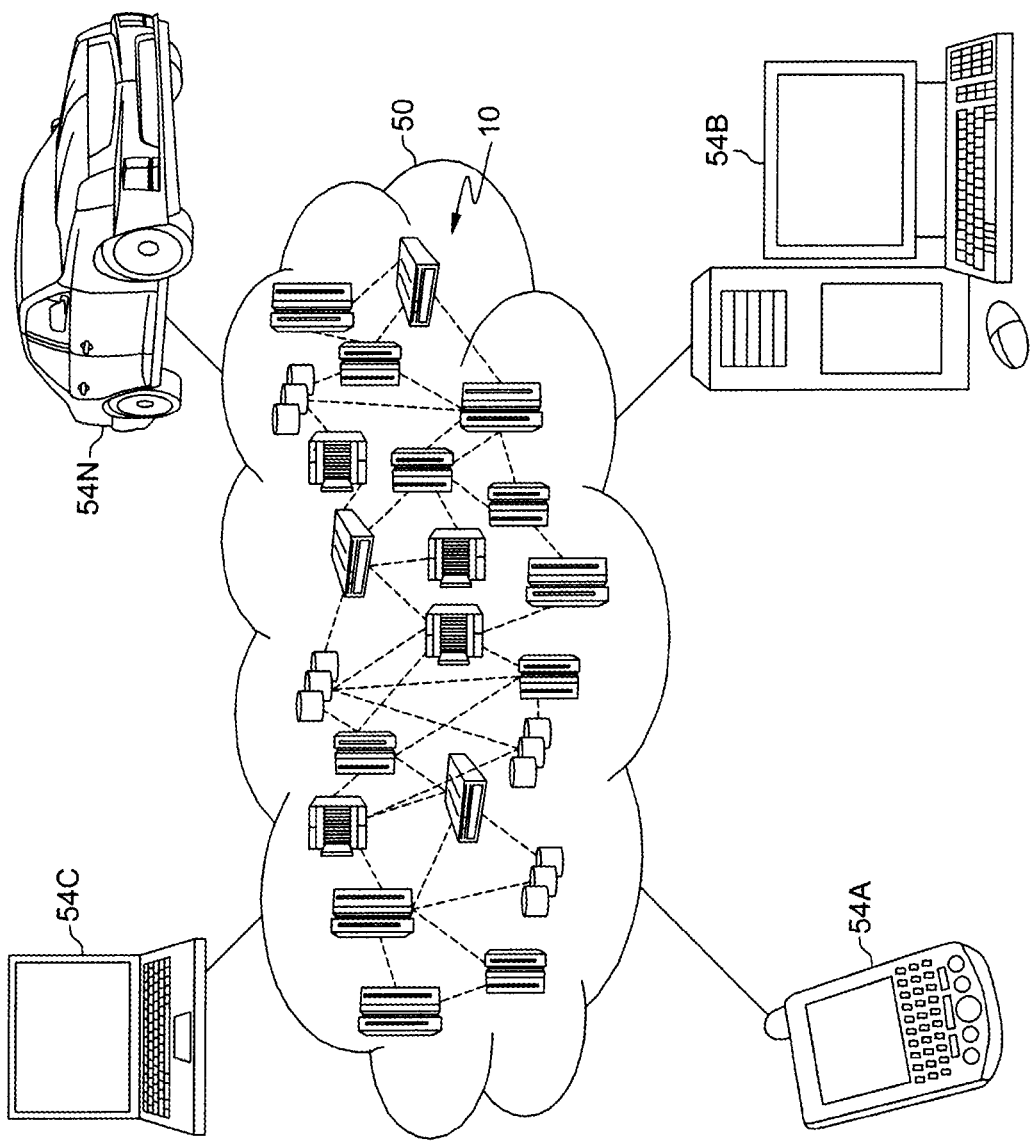
FIG. 7 depicts a cloud computing environment according to an embodiment of the present invention.

Referring now to FIG. 7, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
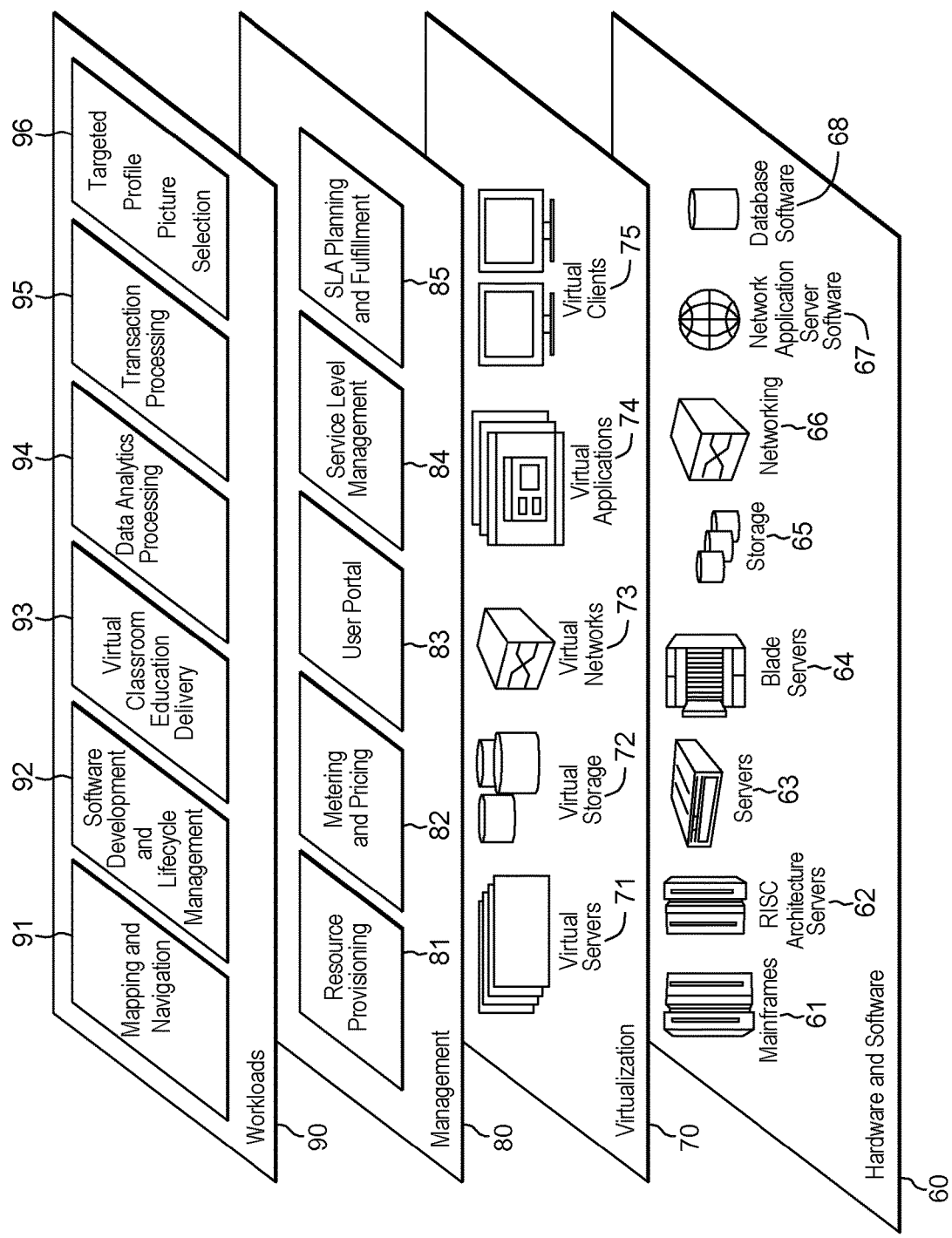
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and targeted profile picture selection 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   maintaining a plurality of definitions of selection rules for
      a plurality of contextual parameter categories upon which contextual messaging service profile picture selection is to be made for a first user of a messaging service, each contextual parameter category of the plurality of contextual parameter categories including a respective one or more definitions of one or more selection rules of the plurality of definitions of selection rules, wherein the plurality of contextual parameter categories and the plurality of definitions of selection rules are presented in a logical hierarchy;

ascertaining a current context under which a profile picture for the first user is to be conveyed to a messaging client of a second user of the messaging service, the current context indicating a parameter for a contextual parameter category of the plurality of contextual parameter categories;

establishing a priority, based on the logical hierarchy, in which the plurality of contextual parameter categories and the respective one or more definitions of one or more selection rules thereof are to be selected and applied in the contextual messaging service profile picture selection to select the profile picture; and based on the ascertained current context and a selection rule of the plurality of selection rules, selecting the profile picture for conveyance to the messaging client of the second user, wherein the selecting the profile picture is further based on the established priority.

2. The method of claim 1, wherein the selecting the profile picture comprises selecting from a plurality of profile pictures for the first user, the plurality of profile pictures available for simultaneous conveyance to other users.

3. The method of claim 1, wherein the contextual parameter category is user identity, wherein the selection rule indicates a particular profile picture to be selected based on an identity of the second user, wherein the selected profile picture is the particular profile picture indicated by the selection rule, and wherein users with different identities are associated with different profile pictures for the first user.

4. The method of claim 3, wherein the indication of the particular picture is made by reference to a user group in which the second user is grouped, wherein the selecting comprises correlating the second user to the user group and selecting the particular profile picture based on the correlating.

5. The method of claim 1, wherein the contextual parameter category is location of the first user, wherein the selection rule indicates a particular profile picture to be selected based on the location of the first user when conveyance of the selected profile picture to the messaging client of the second user is to be made, wherein the selected profile picture is the particular profile picture indicated by the selection rule, and wherein different locations are associated with different profile pictures for the first user.

6. The method of claim 5, wherein the particular profile picture conveys an image indicating the location.

7. The method of claim 1, wherein the contextual parameter category is current connection of a device of the first user, wherein the selection rule indicates a particular profile picture to be selected based on the current connection of the device when conveyance of the selected profile picture to the messaging client of the second user is to be made, wherein the selected profile picture is the particular profile picture indicated by the selection rule, and wherein different connections are associated with different profile pictures for the first user.

8. The method of claim 1, wherein the contextual parameter category is status of the first user, wherein the selection rule indicates a particular profile picture to be selected based on a current status of the first user when conveyance of the selected profile picture to the messaging client of the second user is to be made, wherein the selected profile picture is the particular profile picture indicated by the selection rule, and wherein different statuses are associated with different profile pictures for the first user.

9. The method of claim 1, wherein the contextual parameter category is current time, wherein the selection rule indicates a particular profile picture to be selected based on a current time when conveyance of the selected profile picture to the messaging client of the second user is to be made, wherein the selected profile picture is the particular profile picture indicated by the selection rule, and wherein different times are associated with different profile pictures for the first user.

10. The method of claim 1, wherein the selecting comprises dynamically constructing the profile picture for the first user by overlaying an image over an existing profile picture for the user.

11. The method of claim 1, further comprising storing, on a messaging server through which conveyance of the profile picture to the messaging client of the second user is to be made, a definition of at least one selection rule for each contextual parameter category of the plurality of contextual parameter categories as profile picture settings for the first user, wherein the messaging server performs the selecting the profile picture using the stored profile picture settings for the first user.

12. The method of claim 1, further comprising storing, on a device of the first user, a definition of at least one selection rule for each contextual parameter category of the plurality of contextual parameter categories as profile picture settings for the first user, wherein the device of the first user performs the selecting the profile picture using the stored profile picture settings for the first user and provides an indication of the selected profile picture to a messaging server through which conveyance of the profile picture to the messaging client of the second user is to be made.

13. A computer system comprising:
a memory; and
a processor in communication with the memory, wherein the computer system is configured to perform a method, the method comprising:
maintaining a plurality of definitions of selection rules for a plurality of contextual parameter categories upon which contextual messaging service profile picture selection is to be made for a first user of a messaging service, each contextual parameter category of the plurality of contextual parameter categories including a respective one or more definitions of one or more selection rules of the plurality of definitions of selection rules, wherein the plurality of contextual parameter categories and the plurality of definitions of selection rules are presented in a logical hierarchy;

ascertaining a current context under which a profile picture for the first user is to be conveyed to a messaging client of a second user of the messaging service, the current context indicating a parameter for a contextual parameter category of the plurality of contextual parameter categories;

establishing a priority, based on the logical hierarchy, in which the plurality of contextual parameter categories and the respective one or more definitions of one or more selection rules thereof are to be selected and applied in the contextual messaging service profile picture selection to select the profile picture; and based on the ascertained current context and a selection rule of the plurality of selection rules, selecting the profile picture for conveyance to the messaging client of the second user, wherein the selecting the profile picture is further based on the established priority.

14. A computer program product comprising:

a computer readable storage medium readable by a processing circuit and storing instructions for execution by the processing circuit for performing a method comprising:

maintaining a plurality of definitions of selection rules for a plurality of contextual parameter categories upon which contextual messaging service profile picture selection is to be made for a first user of a messaging service, each contextual parameter category of the plurality of contextual parameter categories including a respective one or more definitions of one or more selection rules of the plurality of definitions of selection rules, wherein the plurality of contextual parameter categories and the plurality of definitions of selection rules are presented in a logical hierarchy;

ascertaining a current context under which a profile picture for the first user is to be conveyed to a messaging client of a second user of the messaging service, the current context indicating a parameter for a contextual parameter category of the plurality of contextual parameter categories;

establishing a priority, based on the logical hierarchy, in which the plurality of contextual parameter categories and the respective one or more definitions of one or more selection rules thereof are to be selected and applied in the contextual messaging service profile picture selection to select the profile picture; and based on the ascertained current context and a selection rule of the plurality of selection rules, selecting the profile picture for conveyance to the messaging client of the second user, wherein the selecting the profile picture is further based on the established priority.

\* \* \* \* \*